(12) United States Patent
Somayazulu et al.

(10) Patent No.: US 9,124,673 B2
(45) Date of Patent: Sep. 1, 2015

(54) TRANSMISSION CONTROL PROTOCOL (TCP) BASED VIDEO STREAMING

(71) Applicants: Vallabhajosyula S. Somayazulu, Portland, OR (US); Sangeetha Siddegowda, San Diego, CA (US); Wu-Chi Feng, Tigard, OR (US); Hassnaa Moustafa, Portland, OR (US); Muthaiah M. Venkatachalam, Beaverton, OR (US); Danny Moses, Reut (IL)

(72) Inventors: Vallabhajosyula S. Somayazulu, Portland, OR (US); Sangeetha Siddegowda, San Diego, CA (US); Wu-Chi Feng, Tigard, OR (US); Hassnaa Moustafa, Portland, OR (US); Muthaiah M. Venkatachalam, Beaverton, OR (US); Danny Moses, Reut (IL)

(73) Assignee: INTEL IP CORPORATION, Santa Clara, CA (US)

( * ) Notice: Subject to any disclaimer, the term of this patent is extended or adjusted under 35 U.S.C. 154(b) by 24 days.

(21) Appl. No.: 14/041,446

(22) Filed: Sep. 30, 2013

(65) Prior Publication Data
US 2015/0095508 A1 Apr. 2, 2015

(51) Int. Cl.
G06F 15/16 (2006.01)
H04L 29/06 (2006.01)
H04N 21/434 (2011.01)

(52) U.S. Cl.
CPC .......... *H04L 65/607* (2013.01); *H04N 21/4343* (2013.01); *H04N 21/4347* (2013.01)

(58) Field of Classification Search
CPC ... H04L 41/0853; H04L 41/20; H04L 45/125; H04L 45/24; H04L 61/2564; H04L 61/2575; H04L 61/2578; H04L 65/1069; H04L 65/80; H04L 67/02; H04L 67/142; H04L 69/163; H04L 69/40; H04L 12/24
See application file for complete search history.

(56) References Cited

U.S. PATENT DOCUMENTS

| | | | |
|---|---|---|---|
| 2003/0018794 A1* | 1/2003 | Zhang et al. | 709/231 |
| 2003/0087629 A1* | 5/2003 | Juitt et al. | 455/411 |
| 2006/0007935 A1* | 1/2006 | Bennett et al. | 370/395.5 |
| 2007/0201500 A1 | 8/2007 | Deshpande | |
| 2007/0276954 A1 | 11/2007 | Chan et al. | |
| 2007/0287473 A1* | 12/2007 | Dupray | 455/456.1 |
| 2008/0151886 A1 | 6/2008 | Gentle et al. | |
| 2009/0094359 A1* | 4/2009 | McDonnell et al. | 709/224 |
| 2009/0178087 A1 | 7/2009 | Menn et al. | |

(Continued)

FOREIGN PATENT DOCUMENTS

EP    1447988 A1    8/2004

OTHER PUBLICATIONS

PCT Application PCT/US2014/056212; filing date Sep. 18, 2014; Intel IP Corporation; International Search Report mailed Dec. 12, 2014.

(Continued)

*Primary Examiner* — Michael Won
*Assistant Examiner* — Nasim Nirjhar
(74) *Attorney, Agent, or Firm* — Thorpe North & Western LLP

(57) ABSTRACT

Technology for reducing delay in data streaming at a wireless device while improving re-buffering and video quality is disclosed. A missing data segment can be detected based on an out-of-order data segment being received in a plurality of data segments from a network element in a wireless network. A fake acknowledgement (ACK) can be sent to the network element in the wireless network, based on the context information, acknowledging that the missing data segment was received at the wireless device. The out-of-order data segment without the missing data segment can be provided for display at the wireless device.

23 Claims, 7 Drawing Sheets

(56) References Cited

U.S. PATENT DOCUMENTS

| | | | |
|---|---|---|---|
| 2009/0268614 A1* | 10/2009 | Tay et al. | 370/236 |
| 2010/0172356 A1* | 7/2010 | Tavares et al. | 370/394 |
| 2012/0120805 A1* | 5/2012 | Maze et al. | 370/235 |
| 2012/0176898 A1* | 7/2012 | Ehsan et al. | 370/232 |
| 2013/0132604 A1* | 5/2013 | Cohen et al. | 709/231 |

OTHER PUBLICATIONS

3GPP; 36$^{rd}$ Generation Partnership Project; Technical Specification Group Services and System Aspects; Feasibility study on 3GPP system to Wireless Local Area Network (WLAN) interworking; 3GPP TR 22.934 v11.0.0; Sep. 2012; 30 pages; Release 11.

3GPP; 3$^{rd}$ Generation Partnership Project; Technical Specification Group Services and System Aspects; Architecture Enhancements to facilitate communications with Packet Data Networks and Applications; 3 GPP TS 23.682 v1.0.0; Feb. 2012; 24 pages; Release 11.

3GPP; 3$^{rd}$ Generation Partnership Project; Technical Specification Group Services and System Aspects; Transparent end-to-end Packet-switched Streaming Service (PSS); Progressive Download and Dynamic Adaptive Streaming over HTTP (3GP-DASH); 3GPP TS 26.247 v10.0.0; Jun. 2011; 94 pages; Release 10.

3GPP; 3$^{rd}$ Generation Partnership Project; Technical Specification Group Services and System Aspects; Transparent end-to-end Packet-switched Streaming Service (PSS); Progressive Download and Dynamic Adaptive Streaming over HTTP (3GP-DASH); 3GPP TS 26.247 v 11.0.0; Sep. 2012; 112 pages; Release 11.

* cited by examiner

| Segment Number | 1 | 2 | 3 | 4 | 5 | 2 | ~110 |
|---|---|---|---|---|---|---|---|
| Receiving Time (TS) | TS_1 | ▨ | TS_3 | TS_4 | TS_5 | TS_H | |

FIG. 1A $D \leq \Delta$

| Segment Number | 1 | 2 | 3 | 4 | 5 | ~120 |
|---|---|---|---|---|---|---|
| Sent Time (TS) | TS_1 | TS_H | TS_H | TS_H | TS_H | |

| Segment Number | 1 | 2 | 3 | 4 | 5 |
|---|---|---|---|---|---|
| Sent Time (TS) | TS_1 | | TS_1 + Δ | TS_1 + Δ | TS_1 + Δ |

| Segment Number | 1 | 2 | 3 | 4 | 5 |
|---|---|---|---|---|---|
| Sent Time (TS) | TS_1 | | TS_3 | TS_4 | TS_5 |

TRANSMISSION CONTROL PROTOCOL (TCP) BASED VIDEO STREAMING

BACKGROUND

Hyper Text Transfer Protocol (HTTP) streaming is a widely used form of multimedia delivery of Internet video. HTTP-based multimedia delivery provides reliability and deployment simplicity due to the broad adoption of both HTTP and its underlying Transmission Control Protocol/Internet Protocol (TCP/IP) protocols. Additionally, HTTP-based multimedia delivery enables easy and effortless streaming services by avoiding network address translation (NAT) and firewall traversal issues. HTTP-based streaming also provides the ability to use standard HTTP servers and caches instead of specialized streaming servers and has better scalability due to minimal state information on the server side. In one example, HTTP streaming may occur between a node (e.g., a transmission station) and a wireless device (e.g., a mobile device). Alternatively, HTTP streaming may occur between the node and a wired device (e.g., a desktop computer).

Wireless mobile communication technology uses various standards and protocols to transmit data between the node and the wireless device. Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) (e.g. Release 8, 9, 10, 11 or 12), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard (e.g. 802.11-2012, 802.11 ac, or 802.11 ad), which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1A illustrates a plurality of transmission control protocol (TCP) segments being communicated to a TCP buffer in accordance with an example;

FIG. 1B illustrates a plurality of transmission control protocol (TCP) segments being communicated from a TCP buffer in accordance with an example;

FIG. 1C illustrates a plurality of transmission control protocol (TCP) segments being communicated from a TCP buffer without a missing TCP segment in accordance with an example;

FIG. 1D illustrates a plurality of transmission control protocol (TCP) segments being communicated from a TCP buffer without a missing TCP segment in accordance with an example;

Figure 2:
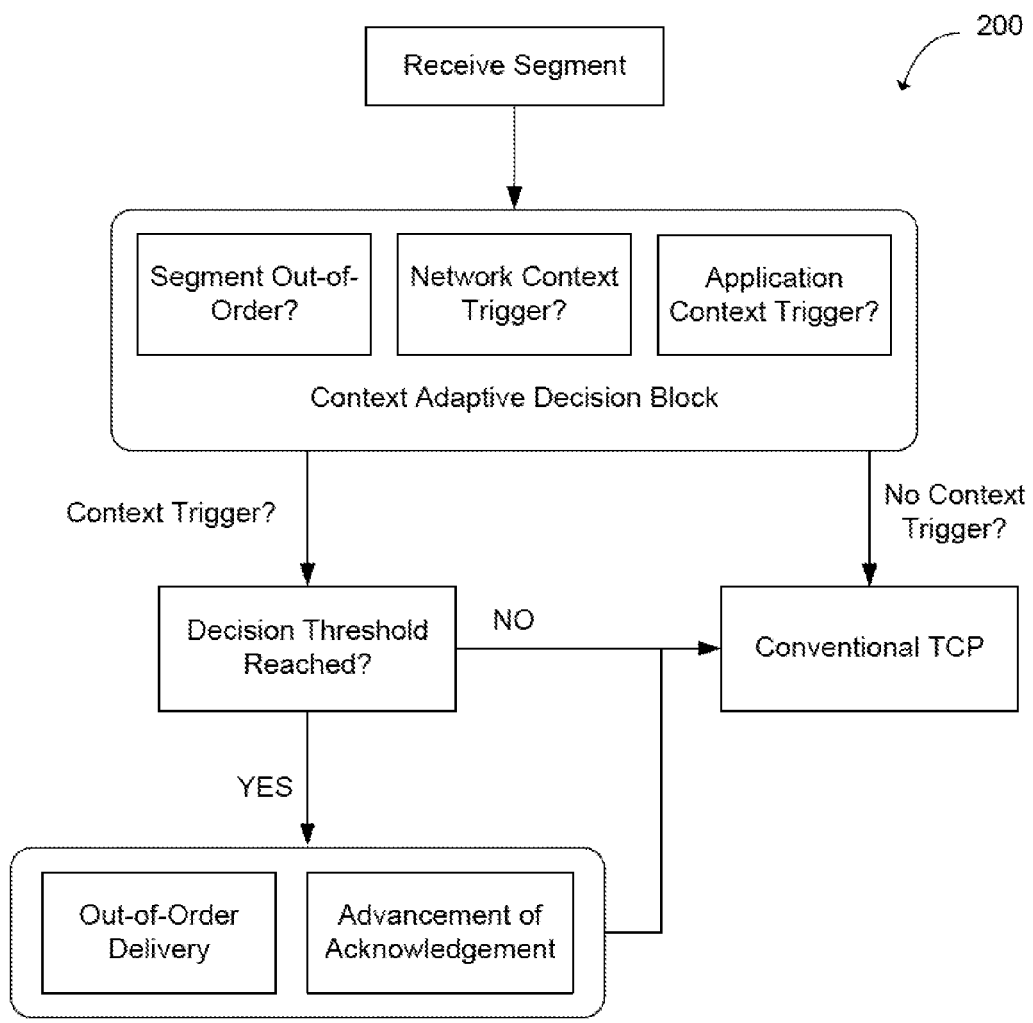
FIG. 2 illustrates a system for communicating transmission control protocol (TCP) segments using context information in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) streaming is a form of multimedia delivery of internet video (e.g., live video or video-on-demand) and audio content—referred to as multimedia content, media content, media services, or the like. In HTTP streaming, a multimedia file can be partitioned into one or more segments and delivered to a client using the HTTP protocol. HTTP-based multimedia content delivery (streaming) provides for reliable and simple content delivery due to broad previous adoption of both HTTP and its underlying protocols, Transmission Control Protocol/Internet Protocol (TCP/IP). HTTP-based delivery can enable easy and effortless streaming services by avoiding network address translation (NAT) and firewall traversal issues. HTTP-based delivery of streaming data can also provide the ability to use standard HTTP servers and caches instead of specialized streaming servers.

In addition, HTTP streaming can provide several benefits, such as reliable transmission, and adaption to network conditions to ensure fairness and avoid congestion. HTTP streaming can provide scalability due to minimal or reduced state information on a server side. However, HTTP streaming may result in latency and fluctuations in the transmission rate because of congestion control and strict flow control. Therefore, HTTP-based streaming systems include buffers to alleviate the rate variations, but as a result, users may experience high latency when the video is being streamed.

Dynamic adaptive streaming over HTTP (DASH) is an adaptive multimedia streaming technology where a multimedia file can be partitioned into one or more segments and delivered to a client using HTTP. DASH specifies formats for a media presentation description (MPD) metadata file that provides information on the structure along with different versions of the media content representations stored in the server as well as the segment formats. For example, the metadata file contains information on the initialization and media segments for a media player (the media player looks at initialization segment to understand container format and media timing info) to ensure mapping of segments into media presentation timeline for switching and synchronous presentation with other representations. A DASH client can receive multimedia content by downloading the segments through a series of HTTP request-response transactions. DASH can provide the ability to dynamically switch between different bit rate representations of the media content as the available bandwidth changes. Thus, DASH can allow for fast adaptation to changing network and wireless link conditions, user preferences and device capabilities, such as display resolution, the type of computer processor employed, or the amount of memory resources available. DASH is one example technology that can be used to address the weaknesses of Real time protocol (RTP) and RTSP based streaming and HTTP-based progressive download. DASH based adaptive streaming, which is standardized in Third Generation Partnership Project (3GPP) technical specification (TS) 26.247 releases, including Releases 10 and 11, and the Moving Picture Experts Group (MPEG) ISO/IEC DIS 23009-1, is an alternative method to RTSP based adaptive streaming.

HTTP's underlying protocol, TCP, is a "connection-oriented" data delivery service, such that two TCP configured devices can establish a TCP connection with each other to enable the communication of data between the two TCP devices. In general, "data" may refer to TCP segments or bytes of data. In addition, TCP is a full duplex protocol. Therefore, each of the two TCP devices may support a pair of data streams flowing in opposite directions. Therefore, a first TCP device may communicate (i.e., send or receive) TCP segments with a second TCP device, and the second TCP device may communicate (i.e., send or receive) TCP segments with the first TCP device.

TCP may assign a segment number to each TCP segment communicated between the first TCP device and the second TCP device. The sending TCP device may expect a positive acknowledgement (ACK) from the receiving TCP device after the receiving TCP device receives the TCP segment. In other words, the receiving TCP device may communicate an ACK message to the sending TCP device after receiving the TCP segment. If the ACK is not received within a timeout interval, then the TCP segment may be retransmitted. Thus, if the sending TCP device does not receive the ACK message from the receiving TCP device within a timeout interval, then the sending TCP device may re-communicate the TCP segment to the receiving TCP device. The receiving TCP device may use the segment numbers to rearrange the TCP segments when the TCP segments arrive at the receiving TCP device out of order and/or to eliminate duplicate TCP segments.

The ACK message communicated between the receiving TCP device and the sending TCP device may include the number of TCP segments that the receiving TCP device can receive from the sending TCP device beyond the last received TCP segment. In other words, the receiving TCP device may communicate a highest segment number that can be received from the sending TCP device, so that the received TCP segments do not produce overrun and overflow in the receiving TCP device buffer. In general, TCP devices may temporarily store the TCP segments received from the network element in a buffer before the TCP segments are communicated to a display device. Alternatively, the TCP segments may be communicated, from the TCP receiver buffer, to another region or module within the user equipment (UE) for processing before the TCP segments are provided to a display device. In one example, TCP segments that have arrived out-of-order may be rearranged within the TCP receiver buffer so that in-order TCP segments may be delivered to the display device. The number of TCP segments that can be stored in the TCP buffer may depend on a TCP buffer size.

In addition, the ACK message communicated between the receiving TCP device and the sending TCP device may include a next expected segment number. The next expected segment number may be the next segment number that the receiving TCP device expects to receive from the sending TCP device. In other words, the next expected segment number may logically follow the last TCP segment successfully received at the receiving TCP device.

In one example, HTTP/TCP based video streaming may be improved by using characteristics of the video data and/or the wireless network. As a result, the HTTP/TCP based video streaming may experience reduced delay and/or improved video quality. In particular, cross-layer information from the application layer and the network layer may be combined to modify the functionality of the TCP receiver. Since the modifications to the TCP receiver may be implemented on the client-side, modifications to the network infrastructure may not be necessary. The modification to the TCP receiver may improve rebuffering, average picture quality, number of rate switches, etc. As a result, the user quality of experience (QoE) may also be improved.

As will be discussed in further detail below, the TCP receiver may receive a plurality of TCP segments from a network element (e.g., a sending TCP device). The TCP receiver may determine that a TCP segment is missing from the plurality of TCP segments. In other words, the TCP receiver may have expected to receive the TCP segment, but the TCP segment was not communicated to the TCP receiver (i.e., the TCP segment is missing).

In general, the missing TCP segment may be retransmitted, from the network element, to the TCP receiver. When the TCP receiver successfully receives the missing TCP segment, then the missing TCP segment may be known as the delayed TCP segment. The TCP receiver may determine whether the delayed TCP segment is received within a predefined time threshold. In one example, the predefined time threshold may be dynamically configured based on network layer information and application layer information.

In addition, the TCP receiver may determine whether the delayed TCP segment has a lower priority level, as compared to the other TCP segments being communicated to the TCP receiver. The TCP receiver may determine that the delayed TCP segment has the lower priority level using the application layer information and the network layer information. The network layer context information may include at least one of: explicit loss indication including media access control (MAC) layer packet loss, loss due to congestion inferred via TCP receiver buffer content analysis, or explicit network congestion information. The application layer context information may include at least one of: buffer status, frame type, saliency of video frames, type of video content, as well as other context such as device context information, or user context information.

If the delayed TCP segment is determined to have a lower priority level (based on the application and network layer information) and the delayed TCP segment is not received at the TCP receiver within the predefined time threshold, then the delayed TCP segment may be dropped. In other words, the TCP receiver may deliver the plurality of TCP segments with a missing TCP segment to a display device. In addition, the TCP receiver may send a fake acknowledgement (ACK) message to the network element falsely acknowledging that the TCP receiver received the formerly missing TCP segment. In addition, the fake ACK message may include the segment number of the next TCP segment that the receiving TCP device expects to receive from the sending TCP device (i.e., the TCP segment that logically follows the delayed TCP segment).

FIG. 1A illustrates a plurality of transmission control protocol (TCP) segments 110 being communicated to a TCP receiver. In particular, the TCP segments may be received in a TCP receiver buffer. In one example, the TCP receiver buffer may receive the TCP segments from a network element (e.g., a sending TCP device). The plurality of TCP segments communicated to the TCP receiver buffer may include a missing TCP segment. For example, segment 1 may be communicated at Time (TS_1), segment 2 may not be communicated to the TCP receiver buffer, segment 3 may be communicated at TS_3, segment 4 may be communicated at TS_4, and segment 5 may be communicated at TS_5. Therefore, the TCP receiver buffer may include a hole that corresponds to the missing segment 2.

When the TCP receiver buffer receives segment 3 without receiving segment 2, the TCP receiver buffer detects that segment 3 is an out-of-order segment. In other words, segment 3 was received at the TCP receiver buffer out of order because the TCP receiver buffer should have received segment 2 before receiving segment 3. When the TCP receiver receives the out-of-order segment (e.g., segment 3), then the TCP receiver may communicate, to the network element, an acknowledgement (ACK) message verifying that the out-of-order segment was received at the TCP receiver. In addition, the ACK message may include the next expected segment number (i.e., the next TCP segment that the TCP receiver expects to receive from the network element). In one example, the next expected segment number may refer to the missing TCP segment (e.g., segment 2) that was scheduled to be received prior to the out-of-order segment (e.g., segment 3). Thus, when the TCP receiver receives segment 3 from the network element, the TCP receiver may communicate an ACK message to the network element with segment 2 as the next expected segment number.

The network device may receive the ACK message from the TCP receiver indicating the next expected segment number (e.g., segment 2). The network device may retransmit the next expected segment (e.g., segment 2) to the TCP receiver. Since segment 2 is missing, segments 3, 4 and 5 may be temporarily stored in the TCP receiver buffer until segment 2 is successfully retransmitted to the TCP receiver buffer. The number of segments that may be buffered at a given time in the TCP receiver buffer may be limited by the TCP receiver buffer size.

In one example, the TCP receiver buffer may receive segment 2 at a time (TS_H) after segments 3, 4 and 5 have been successfully delivered to the TCP receiver buffer. The delivery of segment 2 at the TCP receiver buffer may fill the hole in the TCP receiver buffer caused by the missing segment 2. Thus, segment 2 may go from a missing segment to a delayed segment after being successfully delivered to the TCP receiver buffer. The buffered segments 2-5 may be communicated, for example, to a display device. In addition, after receiving the delayed segment 2, the TCP receiver may communicate an ACK message to the network element: (1) acknowledging that segment 2 was received at the TCP receiver buffer and (2) notifying the network element of the next expected segment (e.g., segment 6).

As previously explained, the delayed TCP segment may be received at the TCP receiver buffer at TS_H. The TCP receiver buffer may wait until the delayed TCP segment (e.g., segment 2) is received before communicating the delayed TCP segment along with the out-of-order segments (e.g., segments 3-5) to the display device. Therefore, segments 2-5 may be communicated to the display device at TS_H (not shown in FIG. 1A). In other words, segments 2-5 may be communicated to the display device at a time corresponding to when segment 2 is received at the TCP receiver buffer (i.e., TS_H). The delay (D) in segments 2-5 being communicated to the display device may be equal to TS_H−TS_1. As a result, a user may experience latency when streaming a video.

In one example, the TCP receiver may determine whether the delayed TCP segment is received within a time threshold ($\Delta$). The time threshold ($\Delta$) may be implemented to reduce the delay of segments being communicated to the display device. In other words, the amount of delay (D) that is acceptable may be limited by the time threshold ($\Delta$). In one example, the time threshold ($\Delta$) may be determined using a feedback mechanism, application layer information, and/or network layer information. The delay may result from one or more delayed TCP segments being delivered to the TCP receiver buffer out of order (i.e., the delayed TCP segments are delivered late), which in turn, affects when the delayed TCP segments and/or out-of-order segments (e.g., TCP segments that were to be delivered after the delayed TCP segments) are delivered to the display device.

As illustrated in FIGS. 1B-1D, there may be three cases to describe the delay (D) of TCP segments being communicated to the display device in relation to the time threshold ($\Delta$). In Case 1 (shown in FIG. 1B), the delay (D) may be less than or equal to the time threshold ($\Delta$). In Case 2 (shown in FIG. 1C), the delay (D) may be greater than the time threshold ($\Delta$). In Case 3 (shown in FIG. 1D), the time threshold ($\Delta$) may be zero.

FIG. 1B illustrates the communication of a plurality of TCP segments 120 (e.g., segments 1-5) from a TCP receiver buffer to a display device. The segments 1-5 may be communicated to the TCP receiver buffer from the network element. As shown in FIG. 1A, segment 1 may have been communicated at TS_1, segment 3 at TS_3, segment 4 at TS_4, segment 5 at TS_5, and segment 2 at TS_H. In other words, segment 2 may be the delayed segment.

As shown in FIG. 1B, when segment 2 is received at the TCP receiver buffer within the time threshold ($\Delta$) (i.e., D≤$\Delta$), the segments 1-5 may be communicated in-order to the display device. In other words, the delayed segment (e.g., segment 2) may also be communicated to the display device. In this example, although segment 2 was received at TS_H, the delay (i.e., (TS_H−TS_1) is acceptable because it is less than the time threshold $\Delta$. Segment 1 may be communicated, from the TCP receiver buffer to the display device, at TS_1, and segments 2-5 may be communicated at TS_H. In addition, the TCP receiver may communicate an acknowledgement (ACK) message to the network element including an expected segment number (e.g., an expected segment number of 6).

When the delayed segment is received at the TCP receiver buffer within the time threshold ($\Delta$), the TCP receiver may not determine a priority level associated with the delayed segment. In general, the priority level of the delayed segment may be determined using application layer information and/or network layer information. In other words, in Case 1, the TCP receiver may deliver the TCP segments to the display device (without using the delayed segment's priority level) when the delayed segment is communicated to the TCP receiver within the time threshold ($\Delta$).

FIG. 1C illustrates the communication of a plurality of TCP segments 130 (e.g., segment 1 and segments 3-5) from a TCP receiver buffer to a display device. The segments 1-5 may be communicated to the TCP receiver buffer from the network element. As shown in FIG. 1A, segment 1 may have been communicated at TS_1, segment 3 at TS_3, segment 4 at TS_4, segment 5 at TS_5, and segment 2 at TS_H. In other words, segment 2 may be the delayed segment.

As shown in FIG. 1C, when segment 2 is not received at the TCP receiver buffer within the time threshold ($\Delta$) (i.e., D>$\Delta$), then the plurality of segments (other than the delayed segment) may be communicated to the display device. Therefore, the delayed segment (e.g., segment 2) may not be communicated to the display device. In this example, when segment 2 was not received within the time threshold ($\Delta$), the TCP receiver determined to drop the delayed segment. Since segment 2 was not received within the time threshold ($\Delta$), the delay is not acceptable and segment 2 is dropped.

Segment 1 may be communicated, from the TCP receiver buffer to the display device, at TS_1, and segments 3-5 may be communicated at TS_1+$\Delta$, wherein the $\Delta$ represents the period of time when the TCP receiver waited for segment 2 to be delivered. In addition, the TCP receiver may communicate an acknowledgement (ACK) message to the network element including an expected segment number (e.g., an expected segment number of 6).

As discussed in further detail below, when the delayed segment is not received at the TCP receiver buffer within the time threshold ($\Delta$), the TCP receiver buffer may determine a priority level associated with the delayed segment. For example, the priority level of the delayed segment may be determined using application layer information and/or network layer information. In one configuration, the TCP receiver may drop the delayed segment (e.g., segment 2) when the delayed segment is not received within the time threshold ($\Delta$) and based on the priority level of the delayed segment.

FIG. 1D illustrates the communication of a plurality of TCP segments 140 (e.g., segment 1 and segments 3-5) from a TCP receiver buffer to a display device. The segments 1-5 may be communicated to the TCP receiver buffer from the network element. As shown in FIG. 1A, segment 1 may have been communicated at TS_1, segment 3 at TS_3, segment 4 at TS_4, segment 5 at TS_5, and segment 2 at TS_H. In other words, segment 2 may be the delayed segment.

As shown in FIG. 1D, when segment 2 is received at the TCP receiver buffer late (i.e., $\Delta$=0), then the plurality of segments (other than the delayed segment) may be communicated to the display device. In other words, the late TCP segments may correspond to holes when the TCP receiver communicates the plurality of TCP segments to the display device. Therefore, the delayed segment (e.g., segment 2) may not be communicated to the display device. In this example, since segment 2 was received late, the TCP receiver determined to drop the delayed segment.

Segment 1 may be communicated from the TCP receiver buffer to the display device at TS_1, segment 2 at TS_3, segment 4 at TS_4, and segment 5 at TS_5. In addition, the TCP receiver may communicate an acknowledgement (ACK) message to the network element including an expected segment number (e.g., an expected segment number of 6).

When the time threshold ($\Delta$) equals zero, the TCP receiver may not determine a priority level associated with the delayed segment. In other words, in Case 3, the TCP receiver may drop the delayed TCP segment out of the plurality of TCP segments being communicated to the display device without using the delayed segment's priority level.

In general, the out-of-order delay experienced by TCP segments in the TCP receiver buffer may be: Un-ordered Delivery Delay (D=0)$\leq \Delta \leq$In-Order Delivery Delay (D=TsH−TS_1). With complete un-ordered delivery, all late out-of-order TCP segments may be treated as holes. In other words, the delayed segments may not be communicated to the display device. With in-order delivery, the TCP segments may be communicated to the display device with no holes. Thus, the tradeoff between TCP packet loss and latency may be derived from the application layer information and the network layer information.

In one configuration, the TCP receiver may use the priority level of the delayed segment (i.e., the segment that was originally missing, but delivered at a later time) to determine whether to drop the delayed segment when the delayed segment is not received at the TCP receiver within the time threshold ($\Delta$). Alternatively, the TCP receiver may use the priority level of the delayed segment to determine whether to not drop the delayed segment, even when the delayed segment is not received at the TCP receiver within the time threshold ($\Delta$). In general, the application layer information and/or network layer information may indicate that a reduction in video quality outweighs the video latency resulting from the delayed segment. In other words, the reduction in video quality may be preferred over waiting for the video to load. Thus, rather than waiting for the delayed segment to be delivered, the TCP receiver may drop the delayed segment altogether in response to analyzing the application and network layer information.

FIG. 2 illustrates a system 200 for communicating transmission control protocol (TCP) segments using context information. A TCP receiver may receive a TCP segment. A Context Adaptive Decision Block may determine whether the received TCP segment is out-of-order. As an example, when the TCP receiver receives segment 3 without receiving segment 2, then the TCP receiver may detect that the received TCP segment (e.g., segment 3) is an out-of-order segment. The TCP receiver may then receive a delayed TCP segment (e.g., segment 2) after receiving the out-of-order segment.

In one example, the Context Adaptive Decision Block 202 may determine whether the delayed TCP segment includes an application context trigger. In other words, the application context information may enable the TCP receiver to determine whether delayed TCP segments should be dropped, such that a plurality of TCP segments are delivered without the delayed TCP segment. A variety of application context information regarding the multimedia information may be identified, such as playback buffer status, frame type or other saliency information for the next video frame expected in the playback buffer, history of information on recent rate switches performed by the adaptive streaming player, etc. The application context information may be obtained from modifications to the client implementation of the DASH or other HTTP adaptive streaming player software on the client.

The application layer context information may include buffer status and history, frame type, saliency, content type, as well as other context such as device context and/or user context. For example, the video data in the playback buffer and the TCP receiver's buffer may have unequal priority for different portions of the data stream (e.g., the video data may have unequal priority depending on whether the video frame is an I/P-frame rather than a B-frame). As another example, when the application is approaching playout buffer starvation and/or the video information expected from the TCP receiver at the tail of the playback buffer is determined to be a B-frame, the Context Adaptive Decision Block 202 may be provided this information in order to determine whether the B-frame should be dropped.

Adaptive streaming clients may use buffer status and history for rate adaptation decisions. In addition to the current buffer status, the application may also provide a history of video rate switches (e.g., adaptations) made in the immediate past. The history of video rate switches may be useful because the user QoE may also be impacted by a frequency associated with rate switching.

The frame type may affect whether a delayed TCP segment may be dropped. I and P frames have temporal dependencies that have a large impact on subsequent frame decoding, while B frames do not have forward temporal dependencies and thus can be dropped with smaller picture quality impact. As an example, the I/P/B frame structure ('GOP') may enable the video player to determine the location of the next expected P frame relative to the next I frame in the sequence. Thus, the impact of potentially dropping that P frame may be estimated. The frame type information may be explicitly accessible in frame headers by the video player.

In one example, saliency (e.g., an importance of a given frame) in terms of visual impact may be used by the video player. For example, if H.264 Scalable Video Coding (SVC) is used, enhancement layer data may have less importance in comparison to base layer video data. Application context information regarding the saliency may be available explicitly in frame headers or may be provided through other mechanisms.

In addition, the video application may tailor the trade-off between re-buffering and picture quality differently depending on whether the content being viewed is live content or video on demand (VOD). In addition, the video application may tailor the trade-off between re-buffering and picture quality depending on whether the content is related to sports, news, etc. Application context information regarding the content type may be provided in content metadata.

In one example, the context information may include device context information. The screen size may play a role in user perception and expectations. The device battery level may be used as context input, as tradeoffs of quality and throughput may be different based on the remaining battery level of the device.

In an additional example, the context information may include user context information. For example, mobile users may face different situations with respect to packet loss, delay and/or throughput as compared to nomadic/fixed users. In addition, users may have different QoE expectations depending on whether the content is free or subscription-based.

In one example, the Context Adaptive Decision Block 202 may determine whether the delayed TCP segment includes a network layer context trigger. In other words, the network layer context information may determine whether the delayed TCP segment should be dropped, such that a plurality of TCP segments are delivered without the delayed TCP segment. Network layer context information may be combined with the TCP processing at the TCP receiver. The network layer context information may include explicit cross-layer information from the network interface (e.g., MAC layer re-transmit failure indication), or explicit congestion notification from network elements.

In addition, the network layer context information may be obtained based on analysis of the TCP receiver buffer contents (e.g., statistics of missing TCP segments awaiting retransmission). Network congestion related losses may be differentiated from losses due to wireless link layer errors on the uplink/downlink. In one example, the network layer context information may be derived from modifications to a network interface card (NIC) driver, etc. In addition, the Context Adaptive Decision Block 202 may analyze the network context layer information (e.g., analyze the TCP receiver buffer for segment holes and associated statistical information, integrate feedback from lower layers regarding wireless/congestion loss), and adjust the threshold ($\Delta$) for outstanding segments that may be released.

Thus, the network layer context information may enable the TCP receiver to determine whether delayed segments should be dropped. The network layer context information may include an indication of a media access control (MAC) layer packet loss (e.g., a retransmission timeout). The indication may be from a network interface card (NIC) or a modem that indicates a missing IP packet. The indication of the MAC layer packet loss may be an explicit signal to the TCP receiver that the missing data is due to wireless link errors as opposed to network congestion. In addition, the network layer context information may be obtained from TCP receiver buffer content analysis. In particular, the statistics associated with the missing segments in the TCP receiver buffer may be examined to provide contextual information about whether wireless link (e.g., random) losses or congestion related (e.g., large burst of holes) losses are being experienced at the TCP receiver buffer.

In one example, the network layer context information may include an explicit congestion notification (ECN) marking in the IP header in order to provide the TCP receiver with network layer context information regarding the TCP segment holes. In one example, the network layer context information may be used to drop delayed TCP segments and forward ACKs when wireless link errors (rather than network congestion) are causing the video player to experience impact to QoE. Large bursts of packet losses may likely be caused by network congestion, and therefore, may not be viable candidates for advancing the ACK because of a potential increased impact on the picture quality. In addition, smaller bursts of packet losses may be from wireless link losses and may be viable candidates for dropping the delayed TCP segments and sending the ACK to advance the TCP segments beyond the holes corresponding to the packet losses.

If the Context Adaptive Decision Block 202 determines that the received segment is in-order (i.e., not out-of-order), as well as an absence of application context triggers or network context triggers, then conventional TCP operation may be performed. If the Context Adaptive Decision Block 202 determines a context trigger and a decision threshold has been reached (i.e., the delayed TCP segment does not meet the delay threshold), then the out-of-order segment may be delivered to the display device, thereby skipping over the delayed TCP segment.

As previously discussed, delayed TCP segments exceeding the delay threshold ($\Delta$) that also indicate a reduced priority level based on the application or network layer context information may be dropped. As a result, the plurality of TCP segments are delivered with a hole, wherein the hole corresponds to the delayed TCP segment. In addition, an acknowledgement (ACK) may be communicated to advance TCP segments beyond the holes. In other words, the ACK indicates that the TCP receiver expects to receive a TCP segment that logically follows the delayed TCP segment. Thus, the TCP receiver may relax the conditions on reliable delivery of information by allowing for selective issuance of fake ACKs for defined TCP segments that are determined to be of lower priority based on the application layer information and network layer information. Therefore, once the delay threshold (Δ) is reached, the Context Adaptive Decision Block 202 may release outstanding TCP segments and the TCP receiver may proceed with the ACK of the next TCP segment.

Figure 3:
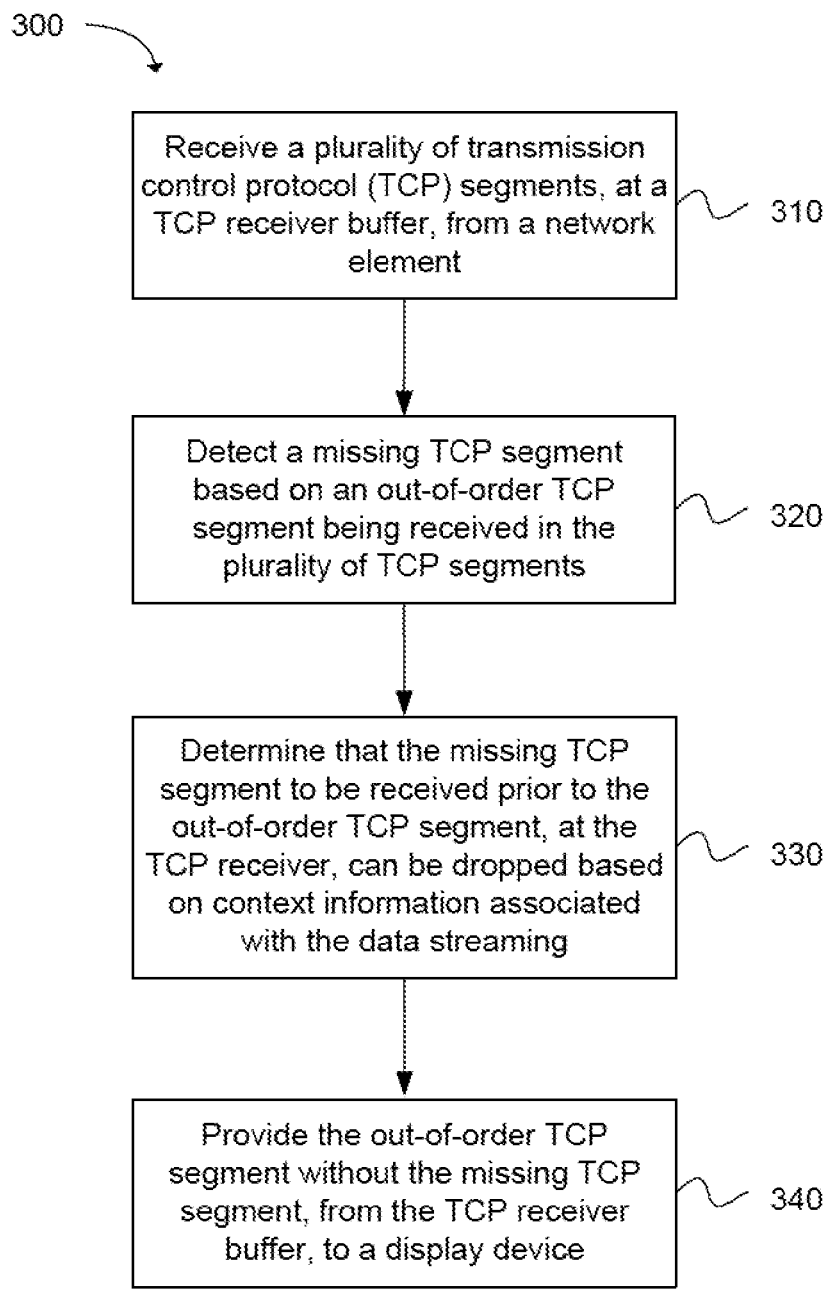
FIG. 3 depicts functionality of computer circuitry of a transmission control protocol (TCP) receiver operable to reduce delay in data streaming in accordance with an example.

Another example provides functionality 300 of computer circuitry of a transmission control protocol (TCP) receiver operable to reduce delay in data streaming, as shown in the flow chart in FIG. 3. The functionality may be implemented as a method or the functionality may be executed as instructions on a machine, where the instructions are included on at least one computer readable medium or one non-transitory machine readable storage medium. The computer circuitry can be configured to receive a plurality of transmission control protocol (TCP) segments, at a TCP receiver buffer, from a network element, as in block 310. The computer circuitry can be further configured to detect a missing TCP segment based on an out-of-order TCP segment being received in the plurality of TCP segments, as in block 320. The computer circuitry can also be configured to determine that the missing TCP segment to be received prior to the out-of-order TCP segment, at the TCP receiver, can be dropped based on context information associated with the data streaming, as in 330. In addition, the computer circuitry can be configured to provide the out-of-order TCP segment without the missing TCP segment, from the TCP receiver buffer, to a display device, as in block 340.

In one example, the computer circuitry can be configured to drop the missing TCP segment based on the context information when the missing TCP segment is not received within a predetermined time threshold. In one configuration, the context information includes network layer context information and application layer context information. In one example, the network layer context information can include at least one of: media access control (MAC) layer packet loss, TCP receiver buffer content analysis, or network congestion information. In addition, the application layer context information can include at least one of: buffer status, frame type, saliency of video frames, type of video content, or other context such as device context information, or user context information.

In one configuration, the computer circuitry can be further configured to send a fake acknowledgement (ACK) message to the network element, based on the context information, acknowledging that the missing TCP segment was received at the TCP receiver. In one example, the fake ACK message includes a request for the TCP segments that logically follow the out-of-order TCP segment to be communicated to the TCP receiver.

In one configuration, the computer circuitry can be further configured to send an acknowledgement message to the network element requesting that the missing TCP segment be re-communicated to the TCP receiver, wherein the missing TCP segment cannot be dropped based on the context information. In addition, the computer circuitry can be further configured to drop the missing TCP segment when the context information indicates that a wireless link error caused the out-of-order TCP segment to be delivered out of order to the TCP receiver buffer. Furthermore, the computer circuitry can be further configured to determine that the missing TCP segment should not be dropped when the context information indicates that network congestion caused the out-of-order TCP segment to be delivered out of order to the TCP receiver buffer.

In one configuration, the TCP receiver can operate in a user equipment (UE). The UE can include an antenna, a touch sensitive display screen, a speaker, a microphone, a graphics processor, an application processor, internal memory, or a non-volatile memory port.

Figure 4:
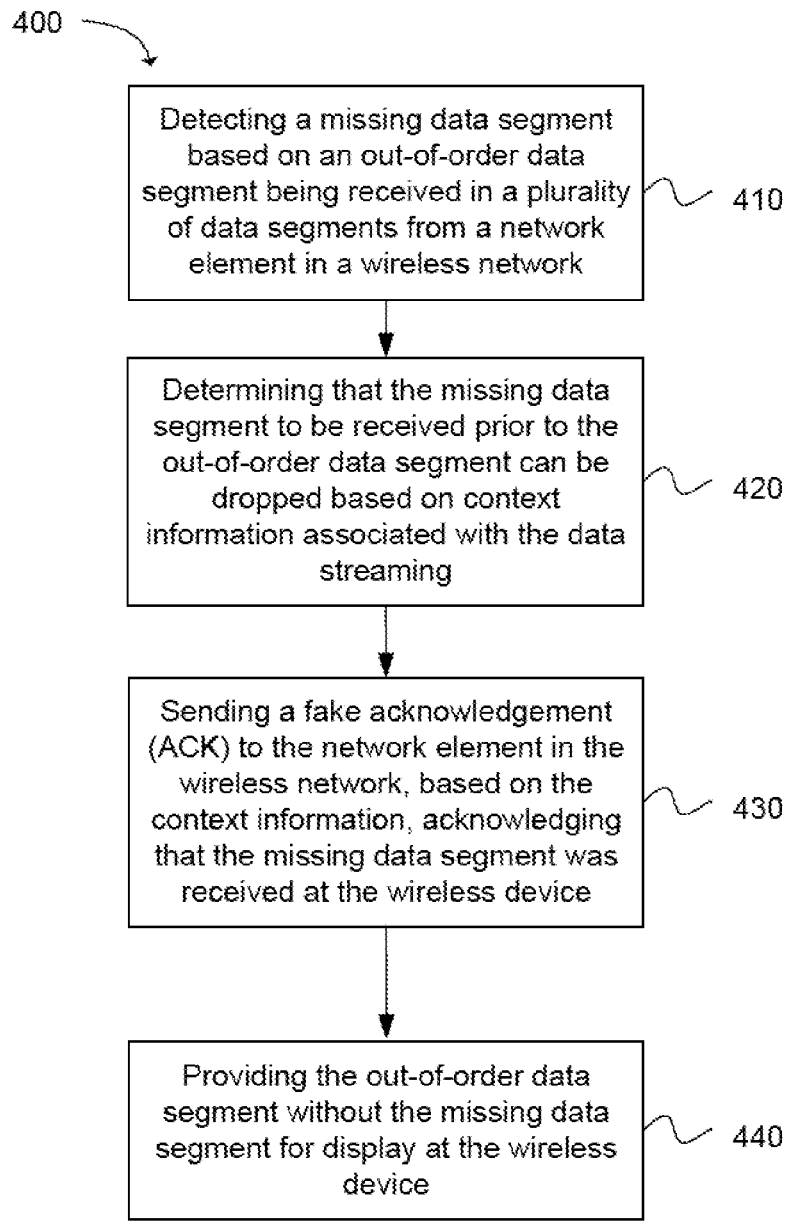
FIG. 4 depicts a flow chart of a method for reducing delay in data streaming at a wireless device in accordance with an example.

Another example provides a method 400 for reducing delay in data streaming at a wireless device, as shown in the flow chart in FIG. 4. The method may be executed as instructions on a machine, where the instructions are included on at least one computer readable medium or one non-transitory machine readable storage medium. The method includes the operation of detecting a missing data segment based on an out-of-order data segment being received in a plurality of data segments from a network element in a wireless network, as in block 410. The method can include determining that the missing data segment to be received prior to the out-of-order data segment can be dropped based on context information associated with the data streaming, as in block 420. The next operation of the method can include sending a fake acknowledgement (ACK) to the network element in the wireless network, based on the context information, acknowledging that the missing data segment was received at the wireless device, as in block 430. In addition, the method can include providing the out-of-order data segment without the missing data segment for display at the wireless device, as in block 440.

In one example, the context information includes network layer context information and application layer context information. In addition, the data segments can be transmission control protocol (TCP) based data segments.

In one configuration, the method can include dropping the missing data segment when not received within a time threshold. In addition, the method can include configuring the time threshold dynamically based on network layer context information and application layer context information. Furthermore, the method can include identifying the context information at the wireless device. In one configuration, the method can include identifying the context information at the network element in the wireless network. In addition, the method can include receiving the plurality of data segments at a transmission control protocol (TCP) receiver, wherein the TCP receiver is included in the wireless device. In one example, the wireless device can be selected from a group consisting of a user equipment (UE), a mobile station, a Bluetooth receiver, a 802.11 receiver, and combinations thereof.

Figure 5:
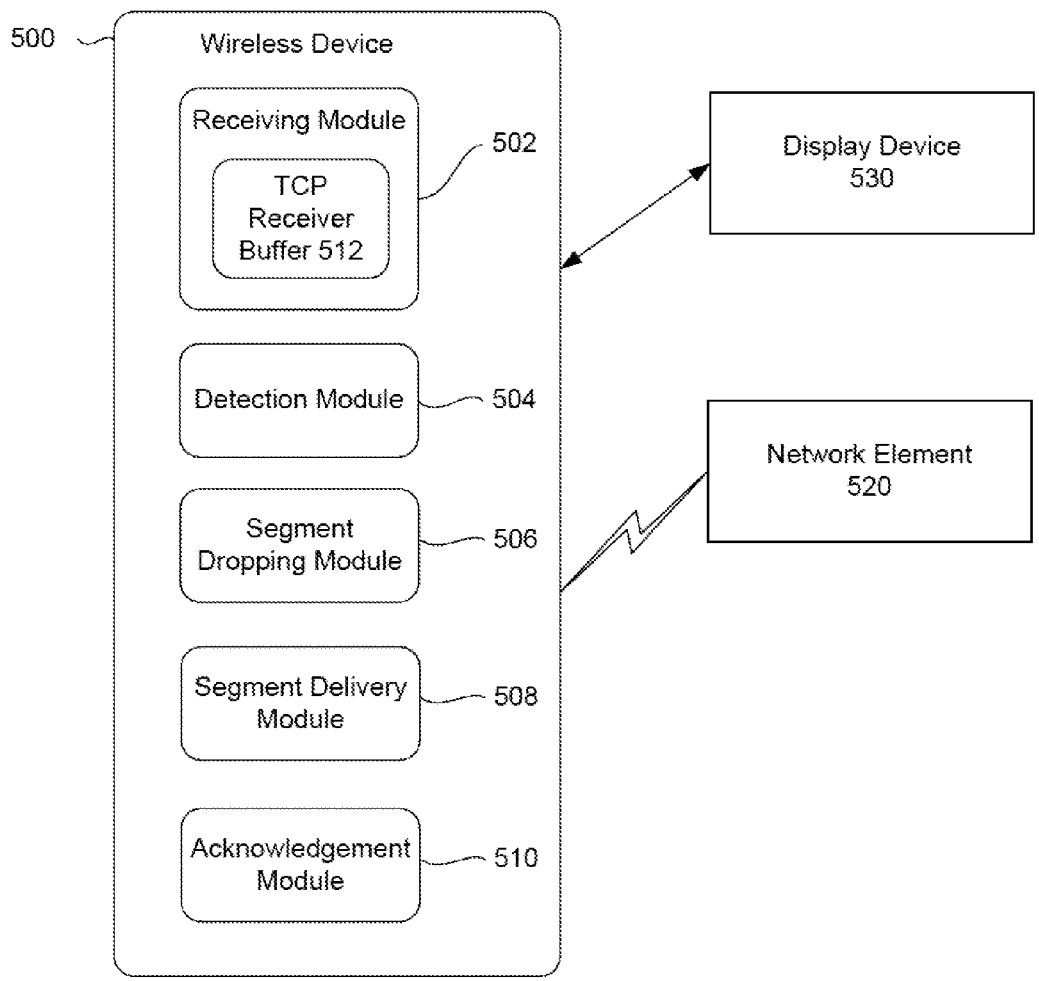
FIG. 5 illustrates a block diagram of a wireless device (e.g. a user equipment) in accordance with an example.

FIG. 5 illustrates an example wireless device (e.g., a user equipment) 500 that is configured for data streaming, as shown in another embodiment of the present invention. The wireless device comprises a receiving module 502 that is configured to receive a plurality of transmission control protocol (TCP) segments, at a TCP receiver buffer 512, from a network element 520. A detection module 504 can be configured to detect a missing TCP segment based on an out-of-order TCP segment being received in the plurality of TCP segments. A segment dropping module 506 can be configured to drop the missing TCP segment to be received prior to the out-of-order data segment based on context information associated with the data streaming.

In one configuration, the wireless device 500 may include a segment delivery module 508 that can be configured to provide the out-of-order TCP segment without the missing TCP segment, from the TCP receiver buffer 512, to a display device 530. In addition, the wireless device 500 may include an acknowledgment module 510 configured to send a fake acknowledgement message to the network element 520, based on the context information, acknowledging that the missing TCP segment was received at the TCP receiver, such as the receiving module 502.

In one configuration, the segment dropping module 506 can be further configured to drop the missing TCP segment based on the context information and the missing TCP segment not being received within a time threshold. In one example, the context information includes network layer context information and application layer context information.

Figure 6:
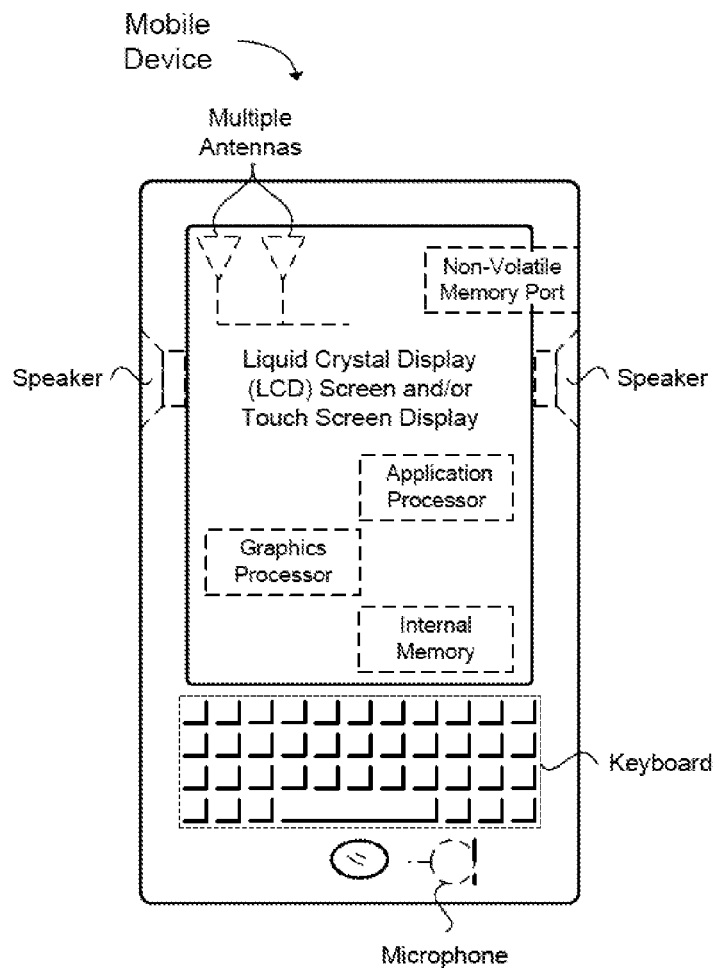
FIG. 6 illustrates a diagram of a wireless device (e.g., a user equipment) in accordance with an example.

FIG. 6 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 6 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A transmission control protocol (TCP) receiver having computer circuitry to reduce delay in data streaming, the computer circuitry configured to:
   receive a plurality of transmission control protocol (TCP) segments, at a TCP receiver buffer in a digital memory device, from a network element;
   detect a missing TCP segment based on an out-of-order TCP segment being received in the plurality of TCP segments;
   determine that the missing TCP segment to be received prior to the out-of-order TCP segment, at the TCP receiver, can be dropped based on context information associated with the data streaming, wherein the context information includes network layer context information and application layer context information; and
   provide the out-of-order TCP segment without the missing TCP segment that is dropped, from the TCP receiver buffer, to a display device.

2. The computer circuitry of claim 1, further configured to drop the missing TCP segment based on the context information when the missing TCP segment is not received within a predetermined time threshold.

3. The computer circuitry of claim 1, wherein the network layer context information includes at least one of:
   explicit loss indication including media access control (MAC) layer packet loss, loss in relation to congestion discrimination via TCP receiver buffer content analysis, or explicit network congestion information.

4. The computer circuitry of claim 1, wherein the application layer context information includes at least one of:
   buffer status, frame type, saliency of video frames, type of video content, or other context such as device context information, or user context information.

5. The computer circuitry of claim 1, further configured to send a fake acknowledgement (ACK) message to the network element, based on the context information, acknowledging that the missing TCP segment was received at the TCP receiver.

6. The computer circuitry of claim 5, wherein the fake ACK message includes a request for the TCP segments that logically follow the out-of-order TCP segment to be communicated to the TCP receiver.

7. The computer circuitry of claim 1, further configured to send an acknowledgement message to the network element requesting that the missing TCP segment be re-communicated to the TCP receiver, wherein the missing TCP segment cannot be dropped based on the context information.

8. The computer circuitry of claim 1, further configured to drop the missing TCP segment when the context information indicates that a wireless link error caused the out-of-order TCP segment to be delivered out of order to the TCP receiver buffer.

9. The computer circuitry of claim 1, further configured to determine that the missing TCP segment should not be dropped when the context information indicates that network congestion caused the out-of-order TCP segment to be delivered out of order to the TCP receiver buffer.

10. The computer circuitry of claim 1, wherein the TCP receiver operates in user equipment (UE).

11. The computer circuitry of claim 10, wherein the UE includes an antenna, a touch sensitive display screen, a speaker, a microphone, a graphics processor, an application processor, internal memory, or a non-volatile memory port.

12. A method for reducing delay in data streaming at a wireless device, the method comprising:
   detecting a missing data segment based on an out-of-order data segment being received in a plurality of data segments from a network element in a wireless network;
   determining that the missing data segment to be received prior to the out-of-order data segment can be dropped based on context information associated with the data streaming, the context information including network layer context information and application layer context information;
   sending a fake acknowledgement (ACK) to the network element in the wireless network, based on the context information, acknowledging that the missing data segment was received at the wireless device; and
   providing the out-of-order data segment without the missing data segment that is dropped for display at the wireless device.

13. The method of claim 12, wherein the data segments are transmission control protocol (TCP) based data segments.

14. The method of claim 12, further comprising dropping the missing data segment when not received within a time threshold.

15. The method of claim 14, further comprising configuring the time threshold dynamically based on network layer context information and application layer context information.

16. The method of claim 12, further comprising identifying the context information at the wireless device.

17. The method of claim 12, further comprising identifying the context information at the network element in the wireless network.

18. The method of claim 12, further comprising receiving the plurality of data segments at a transmission control protocol (TCP) receiver, wherein the TCP receiver is included in the wireless device.

19. The method of claim 12, wherein the wireless device is selected from a group consisting of a user equipment (UE), a mobile station, a Bluetooth receiver, a 802.11 receiver, and combinations thereof.

20. A wireless device for data streaming, the device comprising:
   a receiving module configured to receive a plurality of transmission control protocol (TCP) segments, at a TCP receiver buffer, from a network element, wherein the receiving module is stored in a digital memory device or is implemented in a hardware circuit;
   a detection module configured to detect a missing TCP segment based on an out-of-order TCP segment being received in the plurality of TCP segments, wherein the detection module is stored in a digital memory device or is implemented in a hardware circuit; and a segment dropping module configured to drop the missing TCP segment to be received prior to the out-of-order data segment based on context information associated with the data streaming, wherein the context information includes network layer context information and application layer context information, wherein the segment dropping module is stored in a digital memory device or is implemented in a hardware circuit.

21. The wireless device of claim 20, further comprising a segment delivery module configured to provide the out-of-order TCP segment without the missing TCP segment that is dropped, from the TCP receiver buffer, to a display device, wherein the segment delivery module is stored in a digital memory device or is implemented in a hardware circuit.

22. The wireless device of claim 20, further comprising an acknowledgement module configured to send a fake acknowledgement message to the network element, based on the context information, acknowledging that the missing TCP segment was received at the TCP receiver, wherein the acknowledgement module is stored in a digital memory device or is implemented in a hardware circuit.

23. The wireless device of claim 20, wherein the segment dropping module is further configured to drop the missing TCP segment based on the context information and the missing TCP segment not being received within a time threshold.

* * * * *